April 12, 1932.   R. A. FESSENDEN   1,853,119
METHOD AND APPARATUS FOR DETERMINING DISTANCE BY ECHO
Original Filed March 28, 1921
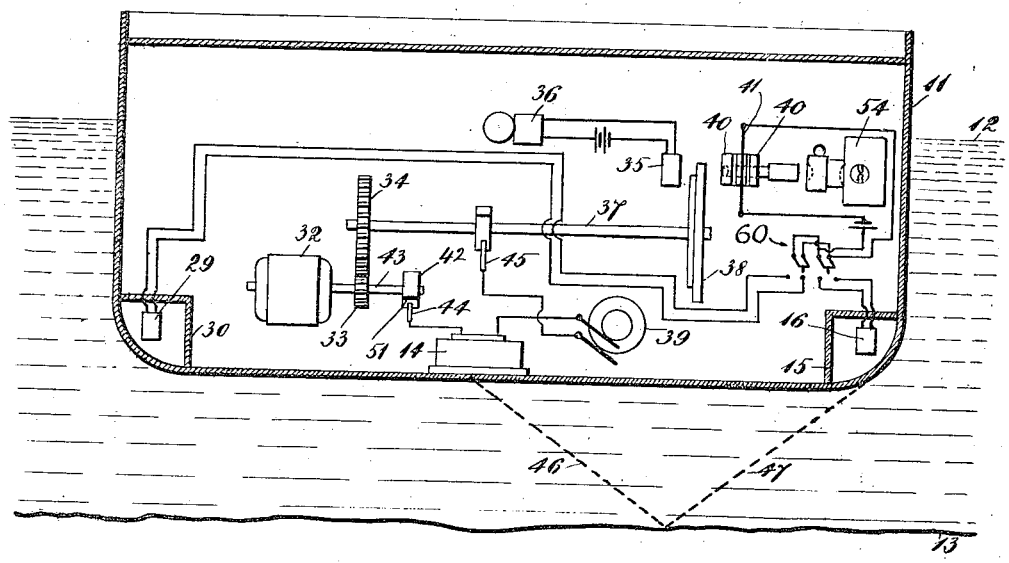
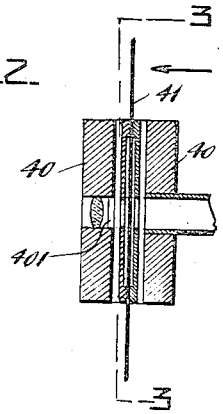 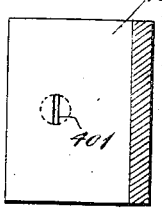 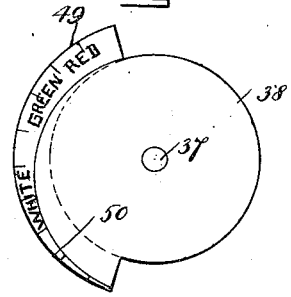
INVENTOR:
Reginald A. Fessenden
BY
ATTORNEYS:

Patented Apr. 12, 1932

1,853,119

UNITED STATES PATENT OFFICE

REGINALD A. FESSENDEN, OF CHESTNUT HILL, MASSACHUSETTS

METHOD AND APPARATUS FOR DETERMINING DISTANCE BY ECHO

Original application filed March 28, 1921, Serial No. 456,112. Divided and this application filed January 9, 1926. Serial No. 80,201.

The present application is a division of U. S. Patent No. 1,636,502, and it relates to methods and apparatus for locating the position of objects by echo particularly their distance and direction, and it includes especially the receipt of such echo by means of a flash of light in connection with a scale whereby observations may be secured from which the distance from a station to the object to be located may be determined. Not only does the present invention have particular application to measuring distance and depth beneath the vessel, but may also be applied to the measurement of heights of an aircraft above the ground from the aircraft itself.

My invention will be understood by reference to the drawings, in which—

Figure 1 shows diagrammatically a means for carrying out my invention;

Fig. 2 being a detail showing the means for supporting the wire.

Fig. 3 is a section on line 3—3 of Fig. 2, and Fig. 4 is an elevation of the scale disk.

In Fig. 1 is shown a method in which the depth is determined by measuring the time taken by the sound in traveling the echo-path, and also by measuring the difference of phase or time of the sounds received by two receivers. This method is hence also peculiarly adapted for determining both the distance and direction of icebergs or mines or derelicts.

In Fig. 1, 11 is the ship. 12 is the water-line and 13 is the bottom of the sea or channel. 14 is a sound-producing member here shown as an oscillator, but it may be of any other suitable character, for example a spark gap in oil, an electromagnetized nickel rod, etc. The oscillator is preferably located in the forepeak tank. 16 is a sound receiver here shown as a microphone immersed in the tank 15, preferably in a different compartment to that containing the sound producer 14, and preferably in a sound shadow so that sounds directly produced by 14 will pass by it. Any other suitable sound receiver may be used.

The path of the sounds to the bottom and reflected therefrom to the receiver is indicated by the lines 46 and 47. The electric impulses from the receiver 16 go to and through the filament 41 of the Fessenden pallograph, or filament galvanometer, of the types shown in applicant's U. S. Patents No. 979,145 filed December 23, 1907, issued December 20, 1910, No. 1,045,782, filed June 16, 1908, issued November 26, 1912, and No. 1,172,018, filed March 14, 1908, issued February 15, 1916, or through the thin strip of that type of applicant's galvanometer shown in applicant's U. S. Patent No. 1,042,778, filed March 22, 1905, issued October 29, 1912.

If the filament type be used, the filament is preferably made of gold, and approximately one ten thousandth of an inch in diameter. Applicant has, contrary to what might be supposed, in view of the great density of gold and its poorer conductivity, found it much superior to all other materials for this purpose. It is much more sensitive than wires of silver or quartz fibres, for reasons which applicant does not know. Also gold wire gives the largest range of readings of any electric instrument known, i. e. applicant has discovered that a gold filament giving unit deflection for one one hundred millionth of an ampere will carry one one hundredth of an ampere without burning out; i. e. will handle without injury one quadrillion times the energy necessary to give unit deflection. Also the wire being made of chemically pure gold, the filament will work as a relay contact with a similar wire without appreciable contact resistance and without change of contact resistance, in this respect differing entirely from all other chemically pure metals.

40, 40 are the magnetic poles of the pallograph, and 54 is the lighting and optical system. 37 is a revolving shaft driven through the gears 33, 34 by the motor 32, and carrying the disc 38, shown in detail in Fig. 4, where is a projecting portion of the disc 38 carrying a scale 49 as shown, and also the spiral curve 50. 42 is a revolving disc mounted on a prolongation of the motor shaft and carrying the contact 51, so arranged that every time the disc 38 comes to the position shown in Fig. 2 with the edge of the projecting portion vertical and the projection to the left, the circuit of the dynamo 39 and oscillator 14 is closed through the brushes 44, 45 as shown and the prolongation of the motor shaft 43 and contact 51, connected electrically to shaft 43, and a sound emitted by the oscillator; either a single impulse or a train of low or high frequency waves as desired and as adapted to the receiving system.

At the instant that the sound is emitted by 14, the wire of the pallograph hanging straight down, no light passes through the opening 401 in the pole piece 40 and the disc 38 is therefore dark and the figures on its scale are invisible or nearly so. When the emitted sound has traveled the echo-path 46, 47 and actuated the receiver 16, the wire 41 is twitched to one side for an instant and the small beam of light from the small hole in 40 illuminates that particular figure on the scale which has reached the point opposite to the hole. The greater the depth of water, the longer will be the echo-path, and the longer will be the portion of the scale which has traveled past the point at which the zero of the scale was when the contact 51 sent out the impulse into the water. Consequently the scale may be graduated to read the depth of water directly in feet, and since in practice the disc 38 revolves about four times per second, owing to persistence of vision the reading is clear and distinct. The illumination is very sharp, almost instantaneous, applicant having in his possession clear photographs taken by him with this instrument showing with perfect sharpness and definition and in its true undistorted shape each individual wave of a group of waves emitted from an antenna at a frequency of thirty-one thousand per second. As this would correspond to a difference in depth of water of less than one inch, it will be evident that very exact soundings may be made, and in practice the time of illumination of the figures on the scale is made one or two orders, i. e. ten or one hundred times greater.

The object of the spiral 50 is to obviate reading the scale. When the depth is zero as shown by the scale, the spiral will be seen at the top of the illuminated portion of the scale as a short horizontal line. As the depth increases this short horizontal line will appear to move downward and the depth of water can be told by noting how far down the short horizontal bar appears from its zero or uppermost position, this being read if desired by another scale. Also the scale portion of the disc 38 may have that portion of the disc carrying the readings between 0 and 10 feet colored red, and that between 10 and 20 colored green.

Also it is preferred to have the scale read only to 50 fathoms, so that when the depth is above 50 fathoms the beam of light from the hole in 40 will not strike the projection of the disc 38, but will fall upon the selenium cell 35 connected to the battery and bell 36, so that as long as the ship is in safe water the bell will ring continuously and its cessation will automatically indicate the shoaling of the water.

The depth reading may be checked by taking a second reading on the receiver 29. Or, having determined the distance of an iceberg, its direction may be found by first taking its distance on the receiver 16 and then on the receiver 29 from which by simple triangulation its direction may be found. A still simpler method is to take readings simultaneously or in rapid succession on 16 and 29 and notice the distance apart of the two short horizontal bars which appear in the illuminated portion. This may be done by means of the switch 60 which may be used to connect receivers 29 and 16 individually or together in the circuit. This will vary as the cosine of the direction angle, and if desired the spiral may be drawn to read directly in degrees. Which side of the bow the iceberg lies is determined by disconnecting one receiver by raising its key, and noting which bar, i. e. the upper or the lower, disappears. If the lower disappears, that receiver is nearest the iceberg. The direction of other sounds may be similarly observed.

What I claim as my invention is:

1. In the art of locating objects by reflected waves, means for transmitting waves, means for receiving the reflected waves, means including in part said receiving means for causing an optical indication of the means for causing the object to change in color in accordance with the distance of the object.

2. In the art of locating objects by reflected waves, means for emitting waves to be reflected, means for receiving the waves so reflected, and means for producing thereby an indication of the distance of the object comprising a continuous source of illumination and a rotating scale synchronized with the emission of the emitted wave on which scale said illumination is adapted to be thrown, and means normally cutting off said illumination from said scale except when said receiving means is actuated.

3. In the art of locating objects by reflected waves, means for emitting waves to be reflected, means for receiving the waves so reflected, and means for producing thereby an indication of the distance of the object comprising a rotating scale synchronized with the emission of the emitted wave, a continuous source of illumination, means for normally preventing said illumination from shining on said scale including an electro-responsive member movable on energization to permit the light to shine on said scale and connections between said receiving means and said electro-responsive member for energizing the latter on receipt of the reflected waves.

4. In the art of locating objects by reflected waves, a continuously rotating measuring scale, means for emitting waves to be reflected when said measuring scale is in an initial position, means for receiving the waves so reflected and means for producing thereby an indication of the distance of the object comprising a source of continuous illumination and means operated by the received waves for causing said illumination to momentarily illuminate the scale indicating the distance of the object.

5. In the art of locating objects by reflected waves, a continuously rotating measuring scale, means for emitting waves to be reflected when said measuring scale is in an initial position, means for receiving the waves so reflected and means for producing therewith an indication of the distance of the object comprising said continuous rotating scale, a shutter and a source of illumination behind said shutter and means including in part said shutter and operated by the received waves for allowing said illumination to shine on said scale.

6. In the art of locating objects by reflected waves, a continuously rotating measuring scale, means for emitting waves to be reflected when said measuring scale is in an initial position, means for receiving the waves so reflected and means for indicating when the object is nearer than a certain distance including said rotating scale and a light sensitive device positioned to be normally shielded by said rotating scale and means for casting a beam of light on said light sensitive device if said reflected waves are received before said rotating scale shields said light sensitive device and means operated by said beam for giving an alarm.

7. The method of determining depths and distances by the aid of a sound producer, sound receiver and indicating means which consists in producing the sound waves, allowing them to travel to the object whose distance is to be measured and be reflected, detecting the reflected sound waves, producing by means of the detected wave a momentary illumination of a continuously rotating scale synchronized with the emission of the emitted wave whereby the measurement indicated on the scale establishes the distance to the object.

8. In the art of locating objects by reflected waves, means for receiving the reflected waves, an indicator having various colors associated with definite distances and means operated by said receiving means for illuminating said colors in accordance with the distance of the object.

9. In the art of locating objects by reflected waves, means for receiving the reflected waves, a rotating indicator having different colors associated with different distances and means operated by said receiving means for illuminating the color corresponding to the depth.

10. In the art of locating objects by reflected waves, means for producing a wave adapted to be reflected from the object whose distance is to be measured, a continuously rotating indicating means having different colors corresponding to different distances, means operating said wave producinng means synchronously associated with said rotating indicating means, means for receiving said reflected wave and means operated upon the reception of said waves to illuminate the indicating means corresponding to the distance of the object whereby the color becomes illuminated corresponding to the distance of the object.

11. In the art of locating objects by reflected waves, means for periodically producing waves adapted to be reflected from the object whose distance is to be measured, an independently rotating indicator adapted to assume different positions corresponding to the different distances that the object may be distant and means operated by the receipt of the reflected wave to illuminate a portion of the indicator whereby the position of the indicator illuminated indicates the distance of the object.

12. In the art of locating objects by reflected waves, means for periodically producing waves adapted to be reflected from the object whose distance is to be measured, an independently rotating indicator adapted to show different colors corresponding to the different distances that the object may be distant, and means operated by the receipt of the reflected waves to illuminate a portion of the indicator whereby the color showing indicates the distance of the object.

REGINALD A. FESSENDEN.